Jan. 2, 1951

H. RABEZZANA 2,536,888

SUPPLY DEVICE FOR ENGINES

Filed Oct. 4, 1945

INVENTOR.
Hector Rabezzana
BY
*A. E. Wilson*
ATTORNEY.

Jan. 2, 1951  H. RABEZZANA  2,536,888
SUPPLY DEVICE FOR ENGINES
Filed Oct. 4, 1945  3 Sheets-Sheet 2

INVENTOR.
Hector Rabezzana
BY
A. E. Wilson
ATTORNEY.

Jan. 2, 1951  H. RABEZZANA  2,536,888
SUPPLY DEVICE FOR ENGINES
Filed Oct. 4, 1945  3 Sheets-Sheet 3
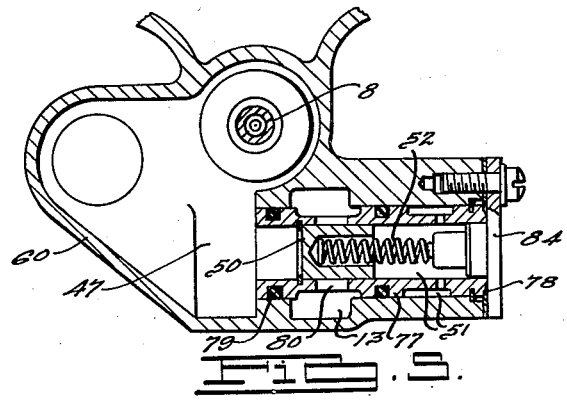
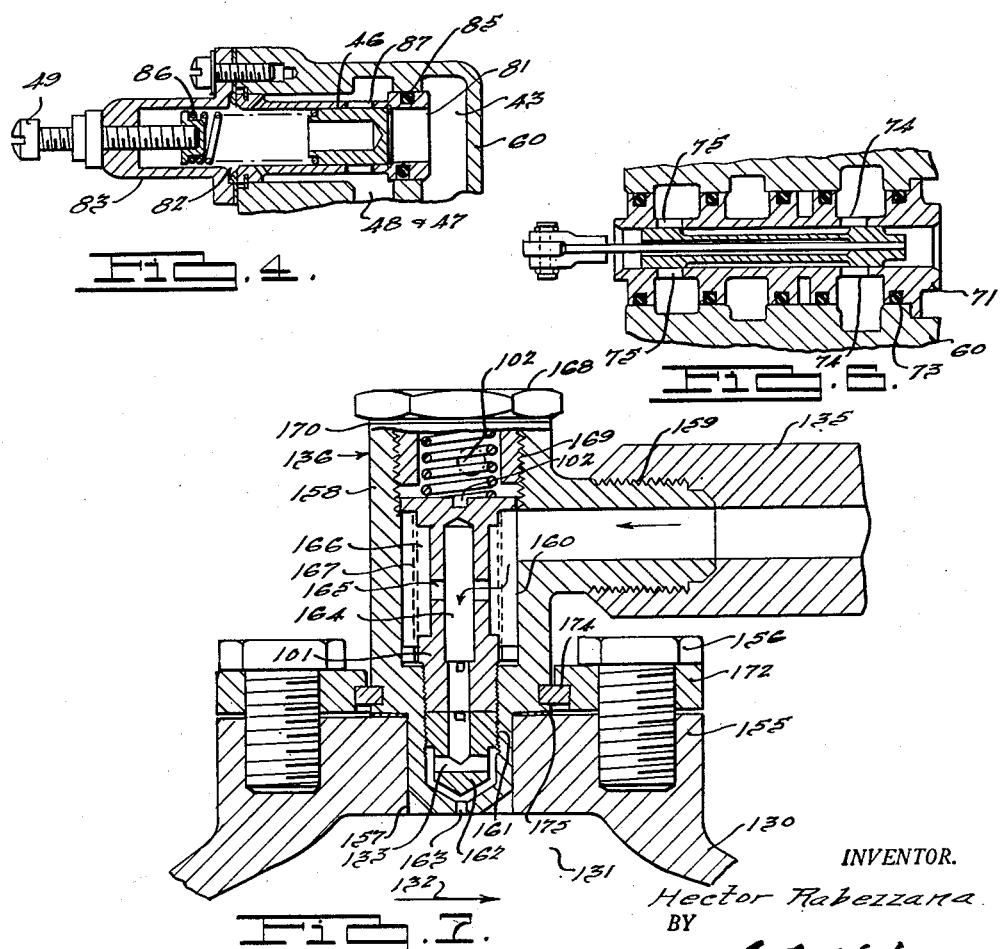
INVENTOR.
Hector Rabezzana
BY
A. E. Wilson.
ATTORNEY.

Patented Jan. 2, 1951

2,536,888

UNITED STATES PATENT OFFICE 2,536,888

SUPPLY DEVICE FOR ENGINES

Hector Rabezzana, Fenton, Mich.

Application October 4, 1945, Serial No. 620,219

5 Claims. (Cl. 123—25)

This invention relates to internal combustion engines, and more particularly to a device for supplying to the cylinders of such an engine a charge component, in addition to the fuel and air mixture normally constituting the charge, designed to prevent detonation and/or to act as a cooling agent.

In internal combustion engines of the reciprocating piston type, detonation in the cylinders occurs or is accentuated under certain conditions as when the absolute pressure of the air in the intake manifold is too high for a given fuel, or when the temperature of the air in the intake manifold is also too high for a given manifold pressure and fuel type. It is therefore desirable to supply to the engine, during such times as the above conditions are present, an anti-detonant in the form of water or other substance, such as an alcohol-water mixture which is not subject to freezing at the temperatures to which it is subjected. Since the conditions above enumerated also generally tend unduly to raise the temperature of the engine, and since detonation itself tends to do the same, it may also be desirable to add to the fuel mixture when such conditions are present a cooling or/and anti-detonating agent such as water or alcohol-water mixture.

The problem above stated is particularly acute in the case of aircraft engines, which operate under extremely wide variations in operating conditions, and wherein it is desirable to obtain from the engine, during limited periods of emergency operation, higher power than the engine is normally capable of developing with a given fuel. Since the maximum power which the engine can without injury develop in such cases is limited by the amount of detonation which takes place, the addition of the anti-detonant makes it possible to operate the engine at higher power, for periods of emergency operation, without engine damage.

The invention, with obvious modifications, may also be applied to land or marine engines, to permit them to operate on low grade fuel which normally has adverse detonating characteristics, which are accentuated under the conditions above mentioned, and which may be mitigated by the addition of an anti-detonant and/or a cooling agent in accordance with the invention. However, for purposes of simplicity in description, the invention is described chiefly with reference to an aircraft engine.

An object of the present invention is to provide automatic means for injecting into the cylinders or in the induction system of an engine an anti-detonant or cooling component.

A further object of the invention is to provide means automatically operable in accordance with the conditions above enumerated for adding a charge component to the fuel mixture flowing to the cylinders.

A further object of the invention is to provide a method and apparatus for adding to the fuel-air mixture an additional charge component during periods when the operating conditions of the engine require the addition of such component.

A further object of the invention is to provide means for injecting individually into the several cylinders of the engine an auxiliary charge component designed to improve the operating characteristics of the engine.

A further object of the invention is to provide an improved injecting means for such auxiliary charge component, designed to inject the auxiliary component at such location and under such conditions as will best contribute to the operation of the engine.

A further object of the invention is to provide means to inject an auxiliary charge component in accordance with a predetermined schedule independent of the local pressure at the point of discharge.

Further objects and advantages of the invention will be apparent from the following description, taken in connection with the appended drawings, in which:

Fig. 4 is a sectional view of a pressure relief valve forming part of the control mechanism;

Fig. 5 is a sectional view of the same taken on line 5—5 of Fig. 2, view partly in elevation and partly in section, taken on the line 5—5 of Fig. 2;

Fig. 6 is a sectional view of the same taken on line 6—6 of Fig. 2; and

Fig. 7 is a detailed view of one of the injection nozzles indicated schematically in Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways.

Also it is to be understood that the phraseology or terminology employed herein is for the purpose of description and not of limitation.

Figure 1:
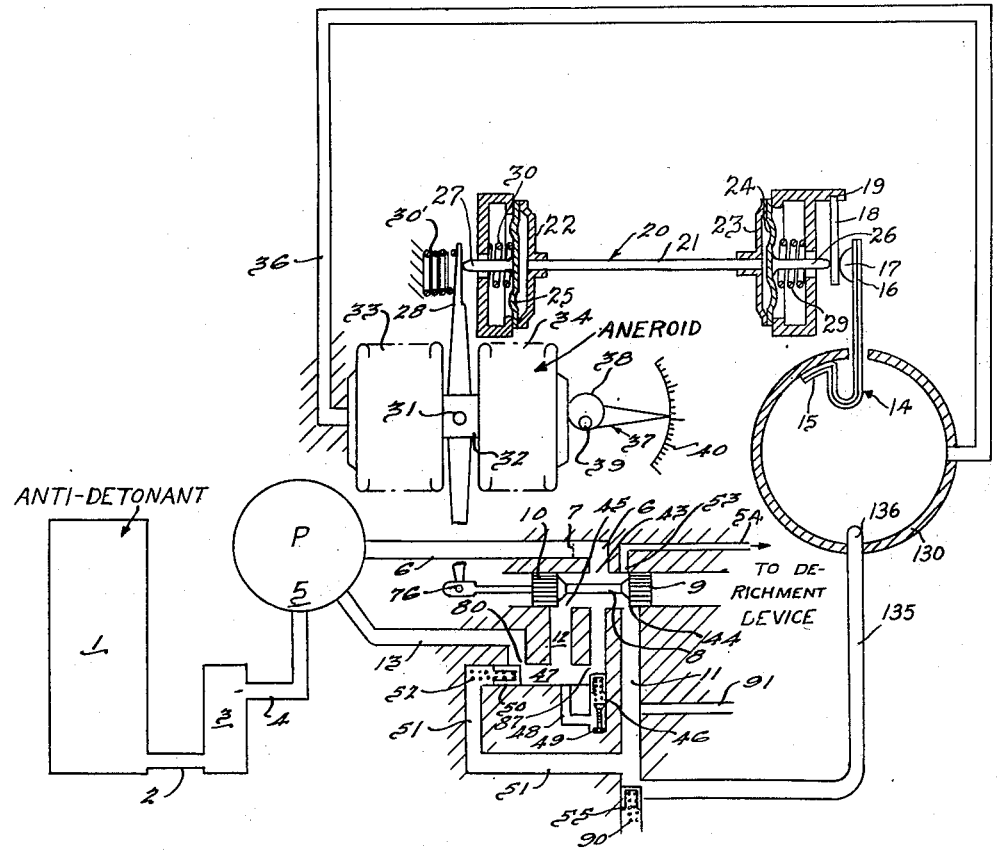
Fig. 1 is a diagrammatic view of an injection device or system embodying the invention.

In the diagram of Fig. 1 there is shown a tank 1, containing a liquid such as water, water-alcohol mixture, or other cooling agent and/or anti-detonant. The tank is connected by means of an outlet pipe 2 to a filter 3 of any suitable type.

The filter outlet is connected by conduit 4 to an electrically or engine driven pump 5, of high enough capacity to meet maximum engine requirements under adverse conditions (worn pump, low voltage, etc.).

Pump discharge is passed through conduit 6 and through screen 7 to the center portion of a balanced metering valve 8, having at one end a land 9 (the metered discharge end); and at the other end, land 10 (the excess discharge end). Land 9 controls the flow through a conduit 11 and thence to the engine. Land 10 controls flow of excess solution through conduits 12 and 13 to the intake side of pump 5.

The positioning of valve 8 is determined in accordance with engine operating requirements as hereinafter described.

A temperature responsive device 14 is mounted in the air intake system, so as to be subjected to the temperature of the air being supplied to the engine. This device, referred to hereinafter as a thermostat, may be constructed in accordance with the disclosure of my Patent No. 2,476,624, granted July 19, 1949, or may be of any other suitable type. It has one end fixed as indicated at 15 and is so constructed that upon a rise of temperature the movable arm indicated at 16, will be moved to the left as shown in Fig. 1.

Hereinafter is described how this leftward movement is utilized to produce rightward movement of metering valve 8, increasing the solution flow in accordance with the temperature rise.

As arm 16 travels leftward it moves member 17 which in turn moves lever 18 pivotally mounted at 19. This movement is transferred through a hydraulic motion transmitter 20 which basically consists of a capillary tube filled with incompressible liquid of low temperature expansibility and a spring loaded diaphragm at each end, to the upper end of a lever 28 whose mid point is carried by bellows, as described hereinafter, and whose lower end is pivotally attached by pin 76 to the metering valve 8.

The hydraulic transmitter 20 consists of a tube 21, and plates 22 and 23 which support and seal diaphragms 24 and 25. The aforementioned parts constitute two interconnected chambers which are filled with a non-freezing and incompressible liquid. The diaphragms carry buttons 26 and 27 which bear against levers 18 and 28 respectively. In order to keep the liquid in the transmitter from vaporizing at high altitudes the diaphragms are spring loaded by springs 29 and 30. An additional spring 30' serves to keep the lever 28 in contact with the button 27.

Lever 28 is pivoted intermediate its length by means of a pin 31 to a movable member 32 which inter-connects the movable ends of the two pressure responsive bellows 33 and 34.

Bellows 34 is an aneroid, whereas bellows 33 is connected by means of a conduit 35 to the intake manifold of the engine. Bellows 33 and 34 are preferably of the same effective area, so that they are equally affected by changes in barometric pressure, and thus balance each other so that the force exerted by the two bellows upon lever 28 is entirely dependent on manifold pressure and independent of ambient pressure.

Thus it will be seen that as the manifold pressure increases, the metering valve 8 moved to the right and at a given air temperature and at a predetermined manifold pressure (at which point detonation would occur), solution is injected, the rate being determined by the amount the valve 8 has moved, which is just enough to keep the engine from detonating.

Likewise it will be seen that as the air temperature increases, the valve 8 moves to the right, and for a given manifold pressure the amount of valve movement will vary with the temperature change, the movement being so proportioned that just enough solution will be injected to prevent detonation for any temperature change. If a metering change is desired as barometric pressure or exhaust back pressure changes, then the area of bellows 33 would be different from the area of bellows 34 by an amount corresponding to the effect desired. In this latter case the pressure within the bellows housing is kept to a constant relationship with barometric pressure or exhaust back pressure.

Detonation can then be overcome by increasing the solution flow as the exhaust back pressure (or barometric pressure) decreases. In this case the aneroid bellows 34 is made smaller than the pressure bellows 33 and the bellows chamber is connected to exhaust back pressure. A reduction of pressure in the bellows chamber produces a movement to the left of the pin 31, and an increase of flow.

Thus the amount of solution supplied to the engine will be determined by the manifold pressure and possible exhaust back pressure and modified according to the intake air temperature.

The desired rate of solution injection depends not only on air temperature, manifold pressure and exhaust pressure, but upon the type of solution and the quality of the fuel.

The amount of solution injected for a given schedule of manifold pressure may be varied by the adjusting mechanism indicated in Fig. 1. It consists of an eccentric or cam 38 carried on a shaft 39 or lever 37. This eccentric or cam bears against the movable end of bellows 34.

Rotary movement of cam 38 causes an axial movement of bellows 33 and 34 and displaces the pin 31, which, through lever 28, for a given temperature, moves valve 8 a given amount and changes the starting point of the solution delivery.

Lever 37 may be moved according to schedule on dial 40 and locked to compensate for change in type of solution or quality of fuel.

The adjusting cam 38 may also be used to vary the solution requirement changes for seasonal changes in installations where the thermostat 14 is not used.

Referring to Fig. 1 as noted before, solution is delivered through conduit 6 to the center portion of valve 8 through orifices 43. From there the solution flow is split two ways; the metered solution by-passes through orifices 44 and on to the engine, and the excess solution by-passes through orifices 45 and on to the pump intake.

In order to maintain a constant pump discharge pressure, a pressure responsive valve 46 of known construction is used, the solution by-passed returning to pump intake through conduits 47 and 13. The back of the pressure relief valves is vented to pressure of conduit 47 by means of balancing line 48.

An adjusting screw 49 permits setting the pump discharge to a greater or lower value and so getting a greater or lesser flow through port 44 for a given valve position.

A spring loaded sliding valve 50, hereinafter called the balancing valve, receives the metered discharge pressure through conduits 11 and 51 on one side, and the excess flow pressure on the other side through conduits 12 and 47. The balancing valve 50 reduces the excess flow through conduits 47 and 13 if the pressure at conduits 11 and 51 is above that of conduits 12 and 47, until the pressure at 12 and 47 is substantially equal to that of 11 and 51.

Likewise if the pressure at conduits 11 and 51 is below that of conduits 12 and 47, the balancing valve 50 will move left-ward permitting a higher rate of excess solution discharge, thus restoring the equalization of pressures within conduits 11, 51 and 12, 47. By this means the pressure drops through the orifices 45 and 44 are kept equal.

Balancing valve 50 is loaded with a light spring 52, so that the valve assumes a position completely blocking inter-communication between the conduits 13 and 47 when the pump 5 is not operating. This is done to insure that any slight stickiness of the valve 50 after a long period of inoperation may be readily overcome by the pressure built up in conduit 47. The spring may be omitted in some installations, and for simplicity its effect will be neglected in the remainder of the description.

When the solution is being delivered to the engine intake it is desirable to lean out the fuel-air ratio to a condition of maximum power. This can be done by using the solution pressure at port 53 which is uncovered after a predetermined amount of solution is delivered to the engine. This pressure may then be applied through conduit 54 to existing apparatus (not part of this invention) capable of setting the fuel-air ratio for best power and economy and to permit the selection of higher manifold pressures at the manifold pressure regulators.

When solution is being delivered to the engine it is necessary to permit the selection of higher manifold pressures; also, when the water supply is exhausted or interrupted, it is necessary to limit the selection of manifold pressures to a safe value.

An optional way of obtaining the above result is by the use of a spring loaded check valve in conduit 11, which raises the pump discharge pressure by the setting of a spring 90. This pressure is set high enough so that it will be substantially higher than the air pressure produced by the pump when the supply of solution is exhausted. This pressure may then be applied through conduit 91 to existing apparatus (not part of this invention), capable of resetting the maximum selected pressures.

Fig. 7 shows in detail one of the atomizing nozzles or jets 136 mounted in wall 130 of the intake manifold and positioned to discharge in a recess 131 thereof so that the spray from the nozzle is to a considerable degree shielded from the flow of air or mixture in the manifold, the direction of flow of which is indicated by the arrow 132. This arrangement decreases the likelihood of the solution freezing when the fuel mixture temperature in the manifold is below freezing. The nozzles are preferably located in a relatively hot portion of the manifold, and if possible where they will be subject to radiated heat from other portions of the engine, to further safeguard the solution against freezing.

Preferably each of nozzles 136 is aligned with and directed toward a corresponding intake port, so that the spray from the nozzle will not penetrate the manifold gallery and be taken away by air flow to the other cylinders. The cone shape of the spray and the velocity of its penetration into the air is preferably selected to substantially prevent condensation of the solution spray on the walls of the manifold branch and intake ports.

The nozzle 136 shown in Fig. 7 comprises a body 158, of corrosion proof material, seated in a bore 157 formed in a mounting pad 155 in the wall of the intake manifold and held in place by a plate 172 which is secured to the pad 155 by means of bolts 156. The body 158 is formed with an internal bore 160, as shown, the outer end of the bore being closed by a plug 168, and sealed by means of a gasket 170. The inner end of the bore terminates in an orifice 163. The body 158 is formed with a nipple 159 adapted for connection with a corresponding conduit 135. The lower portion of the bore 160 is threaded as indicated at 161, to receive a swirl type atomizer 162, although any suitable type of atomizer may be used instead. A plug 101 is threaded in the threaded bore 161 and has a transverse passage 165 and a central passage 164 communicating with a corresponding passage in the atomizer 162, the latter communicating, in turn, with a transverse passage 133 which leads to the outlet orifice 163.

The upper portion of plug 101 is provided with a circumferential recess 166 within which is seated a screen or filter 167. The screen 167 is preferably formed of non-corrodible material and of fine enough mesh to prevent the passage of particles which could obstruct the atomizer.

The removable plug 168 provides a convenient means of access to the nozzle, the plug 101 being then removable by a screw driver inserted in a slot 102, to permit cleaning of the filter. In a similar manner, the atomizer 162 may be removed and cleaned, both operations being performed without removing the nozzle or its feed line.

The body 158 is provided toward the lower end thereof with a peripheral groove adapted to receive a snap ring 174. In the assembly of the nozzle with the intake manifold, the plate 172 is first assembled on the body 158, the ring 174 is then inserted in the groove, and the plate is then secured to the mounting pad 155 by means of bolts 156, compressing gasket 175 so as to form a liquid and gas-tight seal. The plate 172 is provided with a frusto-conical recess 175 to accommodate the ring 174. This arrangement permits the nozzle to be rotated at will to permit it to be aligned with the conduit 135.

From the foregoing description it will be seen that solution flowing through the conduit 135 will pass to the recess 166 of the nozzle and thence through the transverse passage 165 to the longitudinal passage 164; thence the solution will pass through transverse passage 133 to the discharge orifice 163, whence it will be sprayed into the air or mixture in the manifold.

The detailed construction of the water-injection control is shown in Figs. 2, 3, 4, 5, and 6. The control per se (Fig. 2), consists in the main of a body 60 and a cover 61 housing the elements previously described. Solution is permitted to leak past lands 9 and 10 of valve 8 and rise to a level indicated at 62 in Fig. 2, whence it overflows through opening 63 and drains to tank 1 (Fig. 1). The bellows 33, 34 are kept submerged to damp any vibration induced by the engine. The leakage prevents the solution from overheating when the pump is running and no solution is being delivered to the engine.

A minimum manifold pressure stop 64 is provided to keep the valve 8 from traveling leftward an excessive amount under conditions of low pressure in bellows 33 such as encountered in a glide.

A stop 65 is provided to keep lever 28 from traveling an excessive amount clockwise urged by springs 30, when the transmitter is removed from control.

Figure 2:
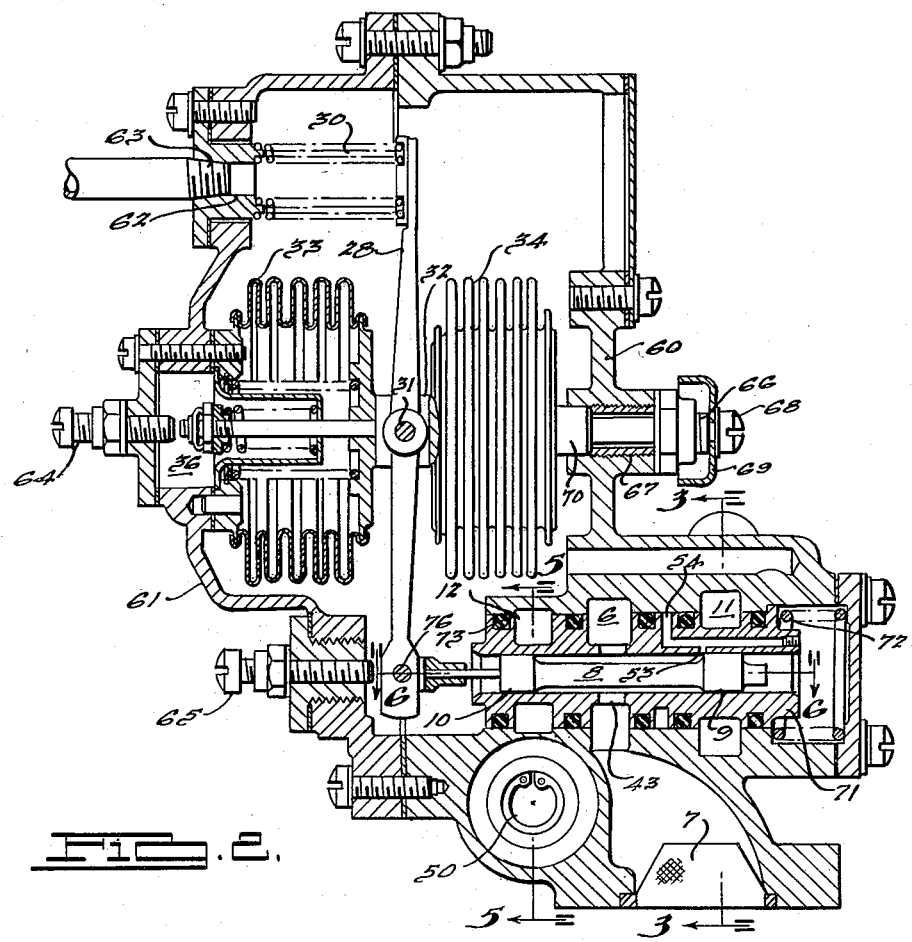
Fig. 2 is a view in vertical section of an assembly comprising the control elements of Fig. 1.
Figure 3:
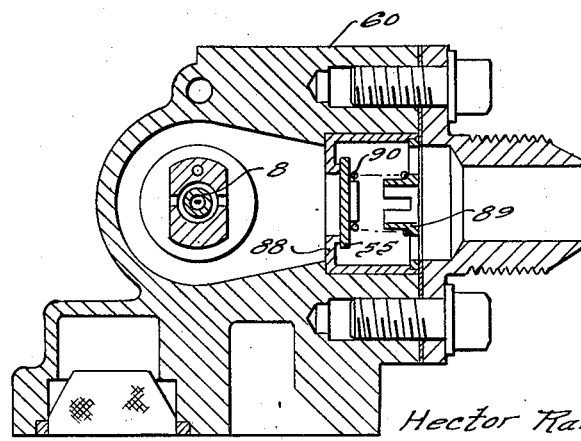
Fig. 3 is a sectional view of the same taken on the line 3—3 of Fig. 2.

Fig. 2 shows an alternative bellows adjustment 66 which is used for factory calibration when the universal adjustment 37 shown in Fig. 1 is not used. It consists of a hollow externally threaded screw, threaded into body 60 the inner end of which bears against the movable header of bellows 34. Clockwise movement of screw 67 moves valve 8 leftward and decreases the solution flow.

Screw 68 passes through hollow adjusting screw 67 and shield 69 and engages in a threaded hole in pilot 70 of a movable header of bellows 34, drawing bellows snugly against adjustment screw 67.

A casing 71 (Figs. 2 and 6) contains metering valve 8, and is held in place in body 60 by a spring 72. The outer surface of casing 71 is provided with circumferential grooves which are fitted with suitable annular seals 73 to prevent solution leakage.

The casing 71 is provided with holes 43 for incoming solution, metered discharge ports 74, surplus discharge ports 75, and derichment port 53.

The adjacent edges of lands 9 and 10 of valve 8 are so spaced that, as the valve is moved to just completely close off either the metering ports 74 or the surplus port 75, the remaining port will be uncovered just enough to discharge the highest solution requirement. Thus the area of the ports uncovered remains constant regardless of the metering valve position.

The shape of the ports 74 and 75 may be rectangular if a linear relationship between valve movement and solution discharge is desired, or contoured if some other flow characteristic is required.

From the foregoing it will be seen that solution discharged at high pressure by the pump (Fig. 1) will flow through passage 6, ports 43, to the space between lands 9 and 10 of valve 8. The position of valve 8 will be dependent upon the forces acting upon lever 28 as above described; during normal operation of the engine, the valve land 9 will completely obstruct the port 74, and all solution entering the valve casing from pump 5 will be bypassed, part of it through ports 75 and conduits 12 and 13 to the pump intake, the remainder of it through port 6, past pressure responsive valve 46, through passages 47 and 13 to the pump intake.

Referring to Fig. 1, it will be seen that since there is no metered discharge through port 44 to produce pressure at 52 against the spring loaded end of balancing valve 50, the bypassed liquid will have unobstructed flow past the balancing valve 50 into the pump intake.

During periods of emergency operation, when the manifold pressure and/or temperature is high enough to call for solution injection, the lower end of lever 28, to which is attached the flexible end of valve 8 by means of pin 76, will move valve 8 rightward. This will have the effect of partially closing the excess discharge ports 75 and uncovering the metered discharge ports 74, permitting flow of solution through conduit 11 and on to the engine, in greater or lesser amount depending on operating conditions of the engine.

After a predetermined flow to the engine is established through ports 74, port 53 will be uncovered, pressurizing the derichment apparatus.

Balancing valve 50 (Fig. 5) is housed in a casing 77 which is held in place in body 60 by means of a cover 84 and a wave washer 78 bearing against the end of casing 77. The casing 77 is provided with circumferential grooves which are fitted with suitable annular seals 79 to prevent solution leakage.

The valve is balanced by surplus discharge pressure from passage 47 on one side and metered discharge pressure from passage 51 on the other side. Under operating conditions balancing valve 50 uncovers a portion of port 80 permitting the surplus solution to pass into passage 13 and to pump intake. Thus the pressures on both sides of the balancing valve are substantially the same, therefore the pressures at metered discharge port 44 (Figs. 1 and 2) and surplus discharge 45 are equal.

The pressure responsive valve 46 (Fig. 4) is housed in a casing 81 which is held in place in body 60 by means of a cover 83 and a wave washer 82 bearing against the end of casing 81. The casing 81 is provided with a circumferential groove which is fitted with a suitable annular seal 85 to prevent leakage.

Solution from pump 1 (Figs. 1 and 4) is discharged through passages 6 and 43 against valve 46. The pressure ahead of valve 46 is built up to get the required flow rate by adjustment of screw 49 which adjusts the pressure that spring 86 exerts against the other end of valve 46.

Under operating conditions valve 46 uncovers a portion of port 87 and permits the surplus solution delivery above engine requirements to pass through passage 47 and 13 to the pump intake. This excess pump capacity over engine requirements is required to insure ample delivery with worn pump and low speed under low voltage conditions when the pump is electrically driven.

The spring end of valve 46 receives surplus discharge pressure through passage 12 and 48, which pressure, as noted in the aforegoing, is substantially equal to the pressure of the metered discharge solution at 11.

Thus the setting of the pressure responsive valve 46 and the pressure drop through port 44 and 45 is determined only by the adjustment of screw 49.

Any changes in discharge pressure at 11 affect both sides of the valve 46 equally, and the solution metering is unaffected.

In order to raise the pressure at 91, which may be used for resetting the maximum selected manifold pressure stop on the manifold pressure regulator, to a valve which is well above the air pressure which would exist at 91, when the supply of solution is exhausted or interrupted, a check valve 55 (Fig. 3) is used.

This valve may consist of a seat 88, valve 55, spring 90, and spring support 89 which is perforated to permit easy egress of metered solution.

The face of the valve 55 which bears up against seat 88 may be of a suitable resilient material which would make a liquid tight seal so that in installations where the solution and fuel are injected into the engine through a common nozzle, the fuel, in event of a leaky check valve in the fuel line, would be restrained from backing up through the solution system.

Although the invention has been described with particular reference to the illustrated embodiments thereof, it is not limited to such embodiments, but may be variously modified within the skill of artisans in this art. The scope of the invention is therefore not limited to the illustrated embodiments, but in accordance with the terms of the following claims.

I claim:

1. Apparatus for supplying an auxiliary charge component to an internal combustion engine having an induction passage and means for supplying fuel thereto, comprising a source of said component, a conduit connecting said source to the engine, a pump in said conduit, a bypass connecting the outlet of said pump to the inlet thereof, a metering valve in said conduit posterior to said pump and controlling the supply of component to the engine and the flow through said bypass, and control means for said valve comprising a temperature responsive member subjected to temperatures in said induction passage, a pressure responsive member subjected to pressures in said induction passage, an aneroid connected to said pressure responsive member to balance the ambient pressure, means including a hydraulic motion transmitter connecting said temperature responsive member and said pressure responsive member to said control valve, and a pressure responsive valve subjected to pressures in said conduit posterior to said control valve for limiting the flow through said bypass.

2. Apparatus for use with an internal combustion engine including an intake manifold, comprising a source of anti-knock fluid, a conduit connecting said source to said engine; a metering valve in said conduit, a floating lever having one portion connected to said valve, a temperature responsive element connected to another portion of said valve, and a pressure sensitive element responsive to absolute pressures in said manifold connected to still another portion of said lever.

3. Apparatus as defined in claim 2, comprising in addition an aneroid capsule connected to said pressure responsive element to affect the operation thereof.

4. Apparatus as defined in claim 3, comprising in addition manually operable adjusting means for varying the forces exerted by said aneroid.

5. Apparatus for use with an internal combustion engine including an intake manifold, comprising a source of mixture component for said engine, a conduit connecting said source to said engine, a pump maintaining the component in said conduit under pressure, a bypass leading from a point in said conduit to the intake of the pump, a valve at said point variably controlling the flow of component to said bypass and to the engine, a floating lever connected to and controlling said valve, a temperature responsive element located in said manifold, a hydraulic motion-transmitting mechanism connecting said temperature responsive element device to said lever, and a pressure responsive element subjected to pressures in said manifold connected to said lever between the points of connection to said valve and to said motion transmitting mechanism and forming a movable fulcrum for said lever.

HECTOR RABEZZANA.

REFERENCES CITED

The following references are of record in the file of this patent:

UNITED STATES PATENTS

| Number | Name | Date |
|---|---|---|
| 1,299,230 | Roos | Apr. 1, 1919 |
| 1,467,333 | Riege | Sept. 11, 1923 |
| 1,504,018 | Berard | Aug. 5, 1924 |
| 1,900,453 | Luplow | Mar. 7, 1933 |
| 1,958,410 | Schaeren | May 15, 1934 |
| 1,981,891 | Woermann | Nov. 27, 1934 |
| 2,055,280 | Dodson | Sept. 22, 1936 |
| 2,059,334 | Gustafsson | Nov. 3, 1936 |
| 2,129,930 | Hans | Sept. 13, 1938 |
| 2,136,959 | Winfield | Nov. 15, 1938 |
| 2,142,979 | Hans | Jan. 3, 1939 |
| 2,233,307 | Dodson | Feb. 25, 1941 |
| 2,305,070 | Butler et al. | Dec. 15, 1942 |
| 2,306,251 | Henning | Dec. 22, 1942 |
| 2,374,844 | Stokes | May 1, 1945 |
| 2,378,036 | Reggio | June 12, 1945 |
| 2,383,563 | Pugh et al. | Aug. 28, 1945 |
| 2,392,565 | Anderson et al. | Jan. 8, 1946 |
| 2,397,984 | Schorn | Apr. 9, 1946 |
| 2,422,808 | Stokes | June 24, 1947 |
| 2,444,179 | Anderson | June 29, 1948 |

FOREIGN PATENTS

| Number | Country | Date |
|---|---|---|
| 372,045 | Great Britain | May 5, 1932 |
| 537,028 | Great Britain | June 5, 1941 |